(12) United States Patent
Alves (10) Patent No.: US 6,973,870 B2
(45) Date of Patent: Dec. 13, 2005

(54) MICROWAVE MILK JUG AND METHOD TO BOIL MILK OR SIMILAR DRINKS IN MICROWAVE JUGS

(76) Inventor: Helio Vieira Alves, Rua Duque de Caxias n° 86, CEP-04748-020, São Paulo (BR)

(*) Notice: Subject to any disclaimer, the term of this patent is extended or adjusted under 35 U.S.C. 154(b) by 0 days.

(21) Appl. No.: 10/628,590

(22) Filed: Jul. 28, 2003

(65) Prior Publication Data

US 2005/0166762 A1    Aug. 4, 2005

Related U.S. Application Data

(63) Continuation-in-part of application No. PCT/BR02/00016, filed on Jan. 31, 2002.

(30) Foreign Application Priority Data

Feb. 1, 2001   (BR) .................................. 0103261

(51) Int. Cl.⁷ .......................... A47J 31/00; H05B 6/82
(52) U.S. Cl. ........................ 99/303; 99/292; 219/689
(58) Field of Search .................. 99/303, 292; 219/689, 219/687, 688, 725

(56) References Cited

U.S. PATENT DOCUMENTS

| | | | |
|---|---|---|---|
| 1,762,303 A * | 6/1930 | McBride | 99/303 |
| 2,570,997 A * | 10/1951 | Willman | 99/303 |
| 4,104,957 A | 8/1978 | Freedman et al. | |
| 4,381,696 A | 5/1983 | Koral | |
| 4,386,109 A | 5/1983 | Bowen et al. | |
| 4,577,080 A | 3/1986 | Grossman | |
| 4,900,886 A * | 2/1990 | Bridges | 219/689 |
| 4,908,222 A | 3/1990 | Yu | |
| 4,990,734 A | 2/1991 | Hirsch | |
| 5,281,785 A * | 1/1994 | Pasbrig | 219/689 |
| 5,635,233 A | 6/1997 | Levinson | |
| 5,800,852 A | 9/1998 | Levinson | |
| 5,832,809 A | 11/1998 | Gras | |
| 5,894,785 A | 4/1999 | Molinari | |
| 5,970,850 A * | 10/1999 | Piazza | 99/303 |

FOREIGN PATENT DOCUMENTS

| | | |
|---|---|---|
| EP | 0 838 186 A1 | 4/1998 |
| WO | WO 01/30217 A1 | 5/2001 |
| WO | WO 02/060304 A1 | 8/2002 |
| WO | WO 02/060306 A1 | 8/2002 |

* cited by examiner

Primary Examiner—Reginald L. Alexander
(74) Attorney, Agent, or Firm—TraskBritt (57) ABSTRACT

The invention consists of a microwave oven driven milk boiling device, which serves to boil natural milk, powdered milk, or similar beverages, or to make chocolate milk, cappuccino or coffee with powdered milk, or even to boil water, all under pressure. In addition, it is useful to serve directly to the table. The milk is boiled in the lower container, which has a safety valve, and conveyed to another container above the boiling container. The milk or other beverage may be boiled within a period of 2 minutes, depending on the microwave oven used.

13 Claims, 11 Drawing Sheets

MICROWAVE MILK JUG AND METHOD TO BOIL MILK OR SIMILAR DRINKS IN MICROWAVE JUGS

CROSS-REFERENCE TO RELATED APPLICATIONS

This application is a continuation-in-part of International Application No. PCT/BR02/00016, filed Jan. 31, 2002, which is a continuation of Brazilian Application No. PI 0003261, filed Feb. 1, 2001, which are hereby incorporated by reference.

BACKGROUND OF THE INVENTION

The present invention consists of a microwave (oven)-driven milk boiling device, useful to boil natural milk or milk-powder or to make chocolate or similar items, or even to boil water; being the boiling made under pressure and during a pre-determinate time, the jug being further useful to serve the boiled milk and the like directly to the table, having an efficient use.

The invention is a new, since there is no notice of a similar domestic or foreign jug for use in microwave oven, as conceived.

As is well-known, milk usually is brought to a boil under fire action and when reaching boiling point, the liquid comes to ebullition and grows in volume, thereby forming gaseous bubbles which rise within the container, which is then removed from the fire to prevent spillage. It is from the state of art a milk jug that uses a cone within a coverless pan-shaped container, which allows the milk to remain boiling, both in the fire and in a microwave oven.

The present invention brings milk to a boil in a filed container and places the already boiled milk in another container, within a period of two minutes, which may vary depending on the microwave oven used. The milk placed in the second container does not spill, because this container contains walls, bottom and a plastic-covered aluminum cap, proper to use in microwave and for food.

The heat is until the boiling point occurs because, under microwave action, friction of mixed liquid and solid molecules is initiated and, with the boiling, steam is formed with a sufficient force to impel the liquid from the bottom container through two sequential tubes, to fall into the upper container, ready to serve at the table and where the liquid is most re-boiled due to the aluminum protection of the upper container.

Both pure milk and chocolate can be boiled likewise, after adding powder to cold or warm milk.

Likewise, it is also possible to prepare milk with water and milk-powder, and further cappuccino or coffee with milk-powder, simply adding powder to cold or warm water and then operating the microwave oven for the same period of time as to boil natural milk.

Thus, one may obtain perfectly sterilized liquids in an adequate form for alimentation, especially for babies, when milk-powder is used and that, in order to become pure, must be prepared in sterilized water.

DESCRIPTION OF MATERIAL USED AND PARTS

MATERIALS: In the making of parts to be described below, microwave oven-resistant and proper to food materials are used the internal walls of the serving container 19' being made in aluminum and covered with plastic; in all parts, plastic (Polyeter Imida PEI) will be used since the material is unbreakable, transparent resistant to high temperatures, proper for microwaves and meets FDA standards in USA, or other standards produced in Brazil or abroad, which may have at least the same technical specifications as that.

Figure 8:
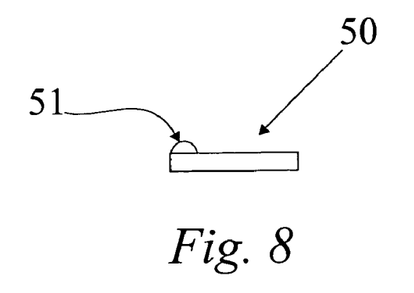

PARTS: BOILING CONTAINER 19—(FIG. 2—Cross-section and FIG. 3—Topview): a, cylinder-shaped plastic container having—a first opening 21 in the first upper part 23 with about 9 cm diameter; at the external part near that first opening 21 it has four points in solid cubic format 1, with face with about 10,5 mm, and which will serve to fasten this part to the SERVING CONTAINER 19' (see FIG. 4); it has a base 3 with about 0,5 cm height, formed by the extension of its side walls 22 beyond the bottom 24; and in this side wall 22, near to the first opening 21, it has a minuscule excavated space 52 with the same thickness as this side wall 22, in a concave half-sphere format, with the larger diameter (0,5 mm) turned outwards, intended to form a Safety Valve together with the external piece 25, which is a rectangular lug-shaped fixed support, where the part named PRESSURE SEALING 50 (see FIG. 8) will fit.

Figure 1:
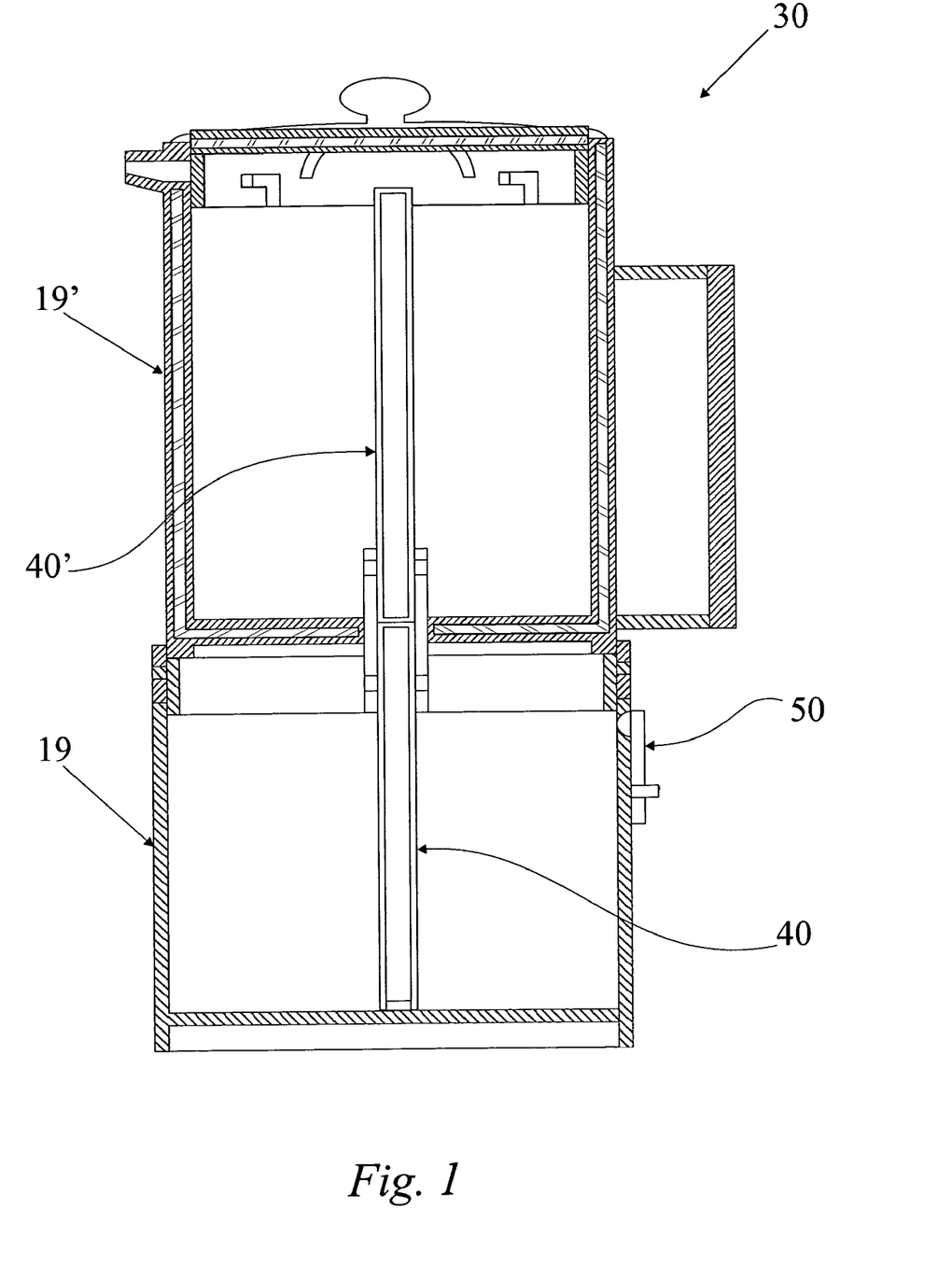
Figure 5:
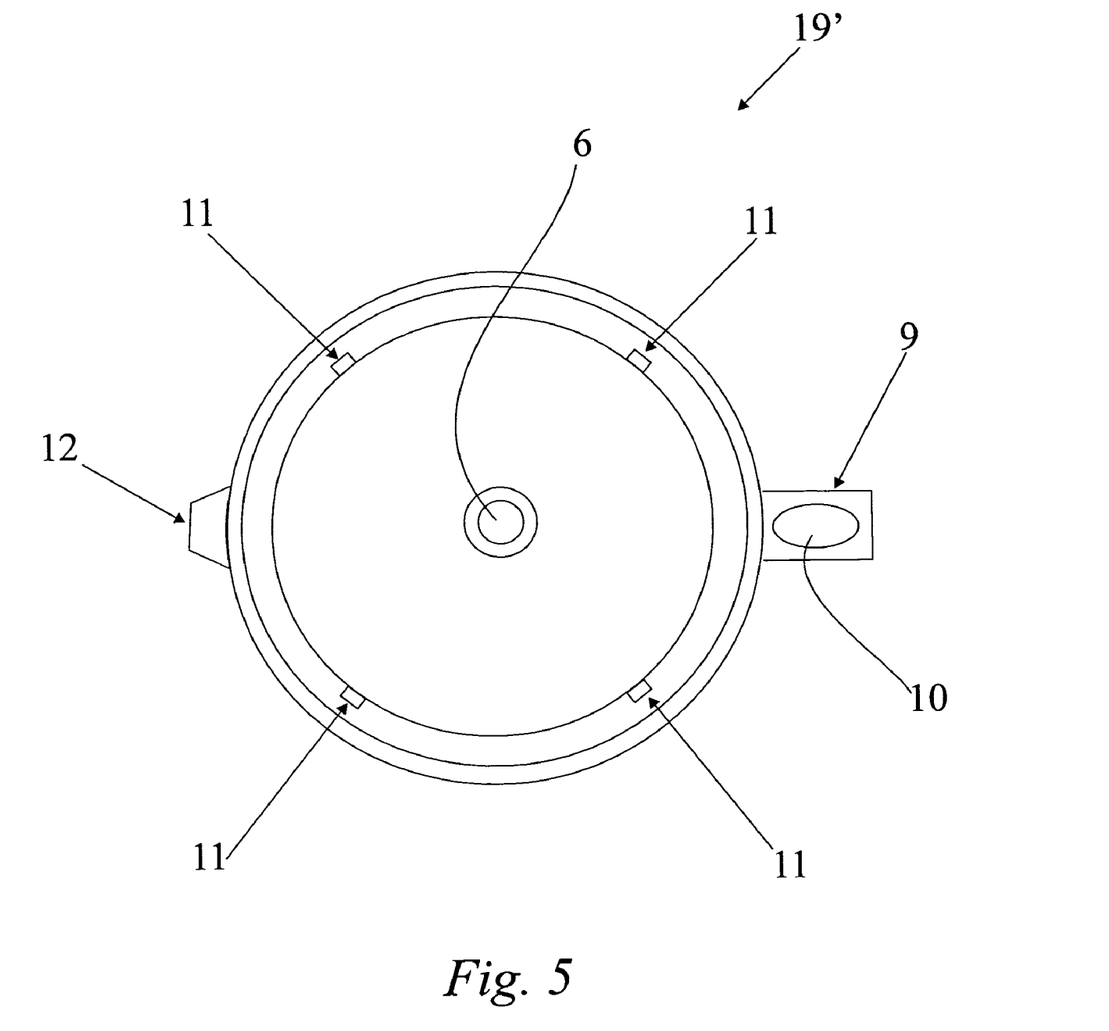
Figures 6A, 7A:
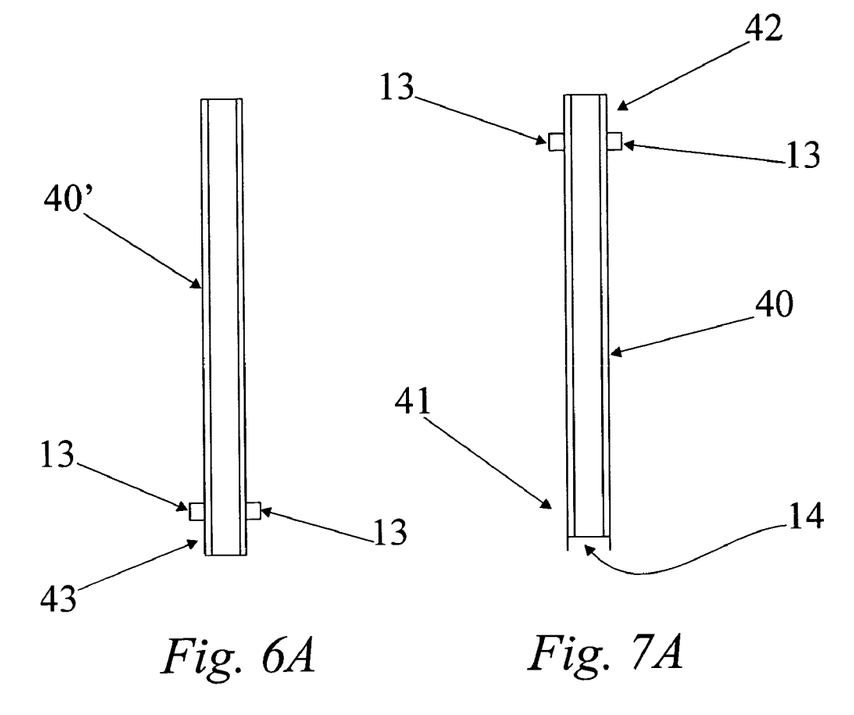
Figure 10:
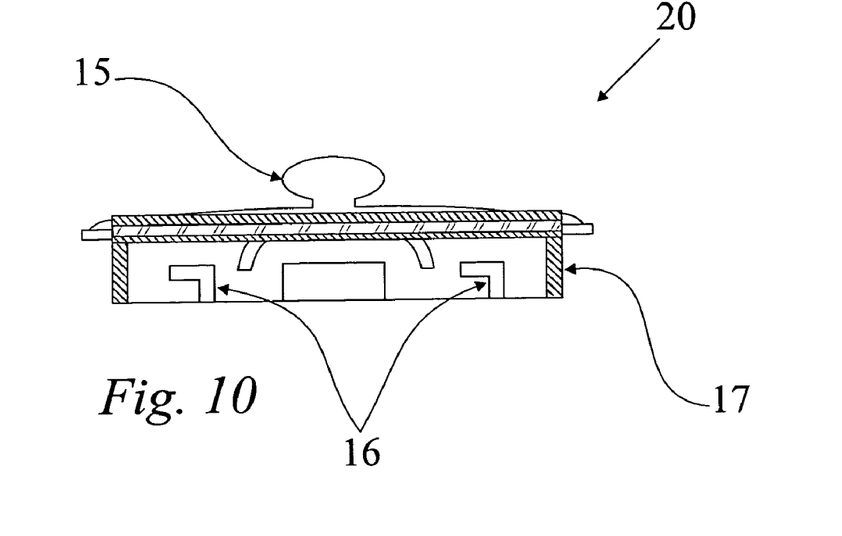

SERVING CONTAINER 19'—(FIG. 4—Cross-section and FIG. 5—Topview section): an aluminum mug-shaped cylindrical container 4 entirely covered with plastic, containing a second opening 5 of about 9 cm diameter in the upper part, containing in the bottom 26 a hole 6 with approximately 1 cm diameter with plastic cylindrical walls 28 around it, which rise both from the bottom 26 to the internal part 7 for about 2 cm and, likewise, to the outside part, which serve to fasten the two liquid conducting tubes 40 and 40' as seen in FIG. 6A and FIG. 7A; it has further a small ring-shaped base 27 (extension of side walls beyond the bottom 26), containing L-shaped notches 8 and which will serve to fit the SERVING CONTAINER 19' (see FIG. 2); it contains one external lug 9 to hold the MICROWAVE MILK JUG 30 (see FIG. 1), which is hollowed in its horizontal parts 10 which connect it with the container 19'; and above, in the outside part, near the second opening 5, it has four 0.5 mm points in a solid cubic format 11 which will serve to hold the MILK JUG CAP 20 (see FIG. 10); it has further, in the upper part, one liquid outlet nozzle 12 to serve at the table.

Figure 6B:
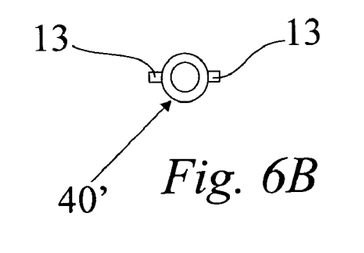
Figure 7B:
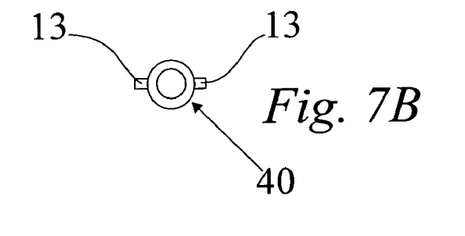

LIQUID CONDUCTING TUBES 40 and 40'—(FIGS. 6A and 6B)—Cross-section and topview; and FIGS. 7A and 7B—Cross-section and topview): made in plastic in cylindrical format, with a size near containers 19, 19' height and diameter of about 1 cm. FIGS. 6A and 6B show the second tube conducting 40' that comprises outside pins 13 of solid cubic formats positioned at a first end 43, that fits the entrances 29 at the internal base of the cylindrical walls 28 of the SERVING CONTAINER 19' (see FIG. 4); and in the first tube conducting 40 of FIGS. 7A and 7B, which, in addition to be equal to the second tube conducting 40', this first tube conducting 40 has outside pins 13 of solid cubic formats positioned at its second final part 42 and fit to the base of the cylindrical walls 28 externally located from the bottom 26 center of the SERVING CONTAINER 19' (see FIG. 4), further this first tube conducting 40 has two rectangular notches 14 around its first final part 41 of its mouth which will serve for entrance of liquids, which will be done under pressure.

In the occasional obstruction of the first tube conducting 40, the safety valve of the BOILING CONTAINER 19 (see FIG. 2) will be operated.

Figure 9:
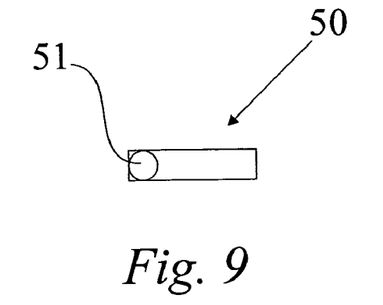

PRESSURE SEALING 50—(FIG. 8—Cross-section and FIG. 9—topview section); a rectangle-shaped plastic piece, having in one of its ends and in the width part, the added format of a convex half-sphere 51, which will fit into the excavated space 52 existing in the side wall 22 near the first opening 21 of the BOILING CONTAINER 19 (see FIG. 2) for sealing, and holding to the external lug as it is seen in MICROWAVE MILK JUG 30 (see FIG. 1), thereby forming the Safety valve of this container 19.

Figure 4:
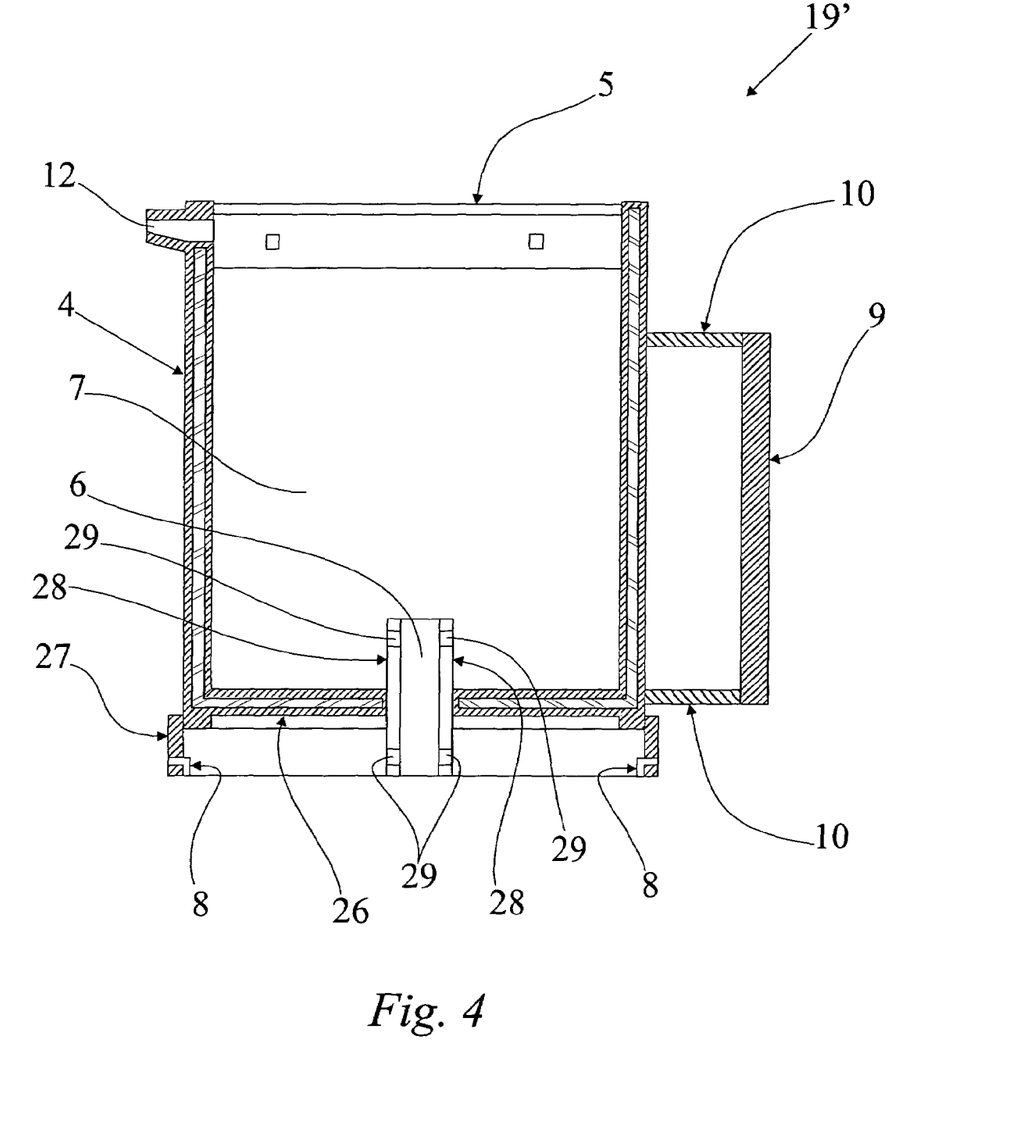
Figure 11:
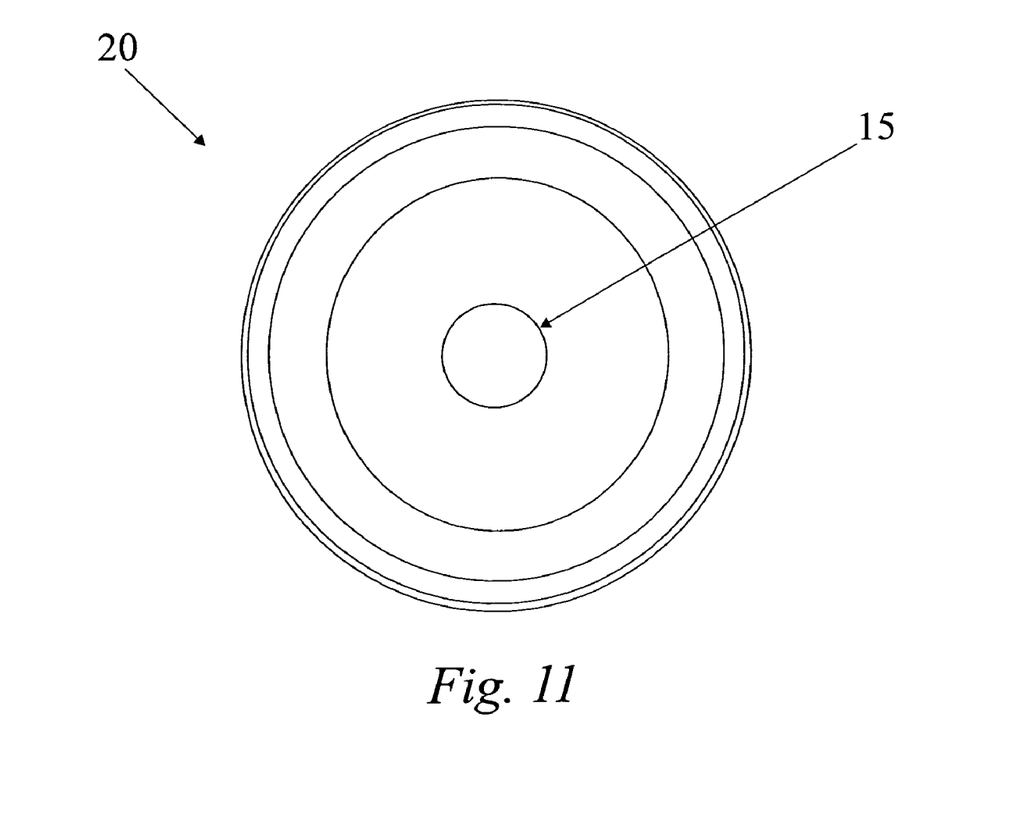

SERVING CONTAINER CAP 20—(FIG. 10—Cross-section and FIG. 11—topview section): made in plastic and cylindrical format, it contains in its upper part a round shape gripper 15 in order to grip it, and a cylinder-shaped side wall 17 containing four L-shaped hollows 16, intended to fit into the second opening 5 of the SERVING CONTAINER 19' (see FIG. 4).

DETAILED DESCRIPTION OF THE INVENTION

Figure 12:
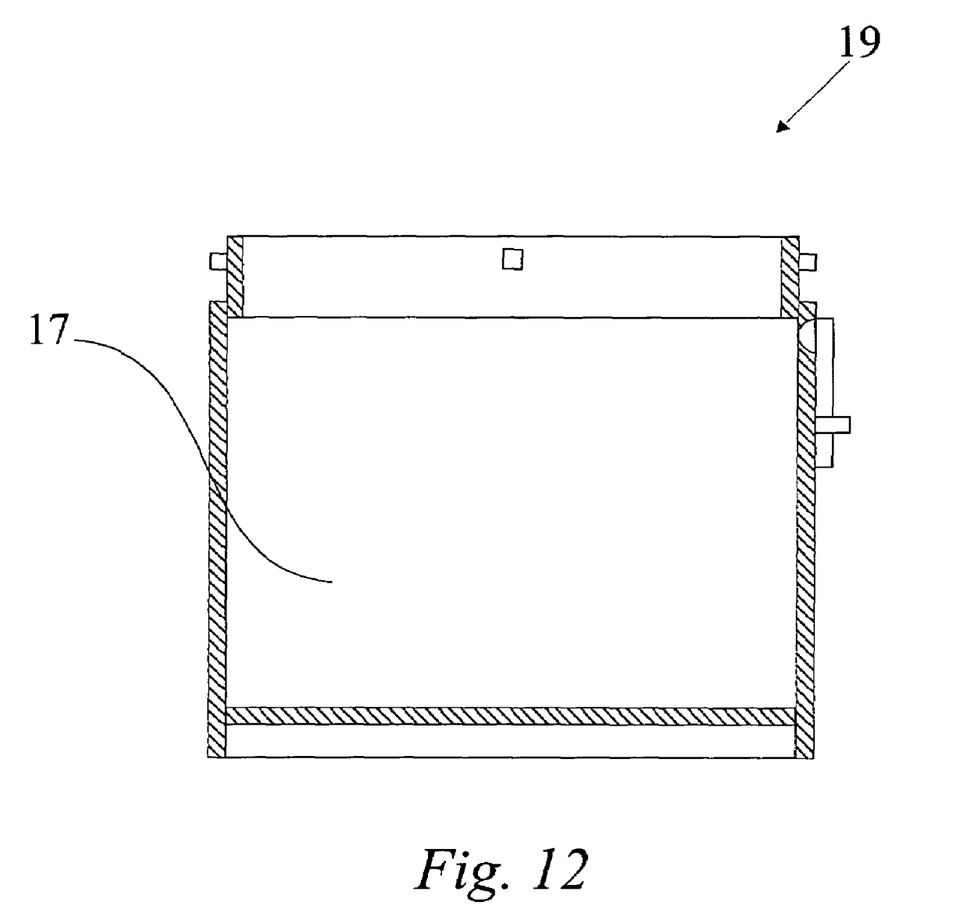

FILLED BOILING CONTAINER 19 (see FIG. 12); SERVING CONTAINER 19' WITH TUBES 40, 40' ADDED (see FIG. 13); MILK JUG 30 READY TO BOIL (see FIG. 14); MILK JUG 30 BOILING MILK (see FIG. 15); MILK JUG 30 WITH BOILED MILK TO SERVE (see FIG. 16).

MILK JUG 30 operation is now described, whose procedures are mostly common in its general use.

Figure 2:
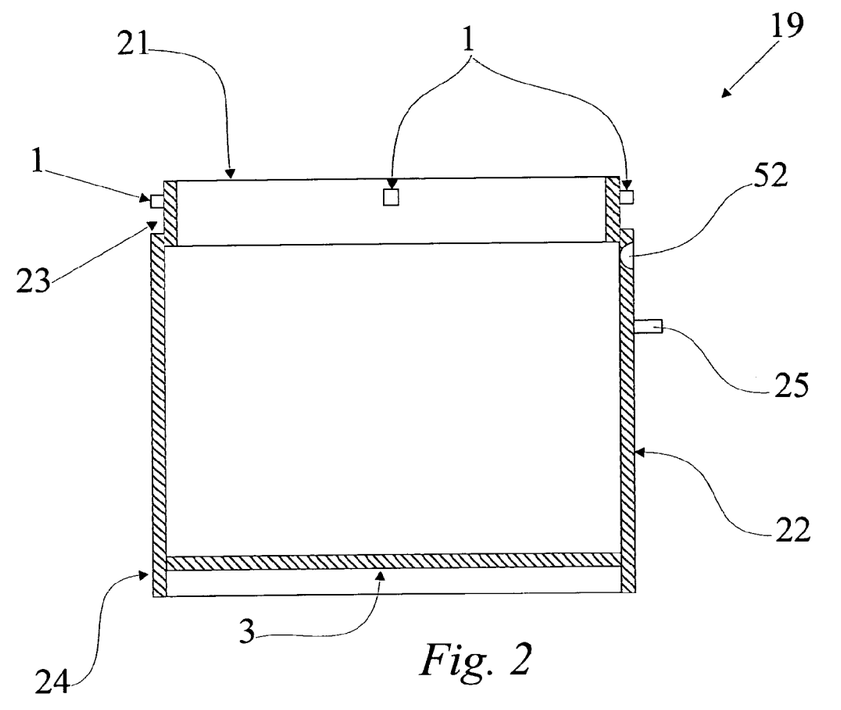
Figure 3:
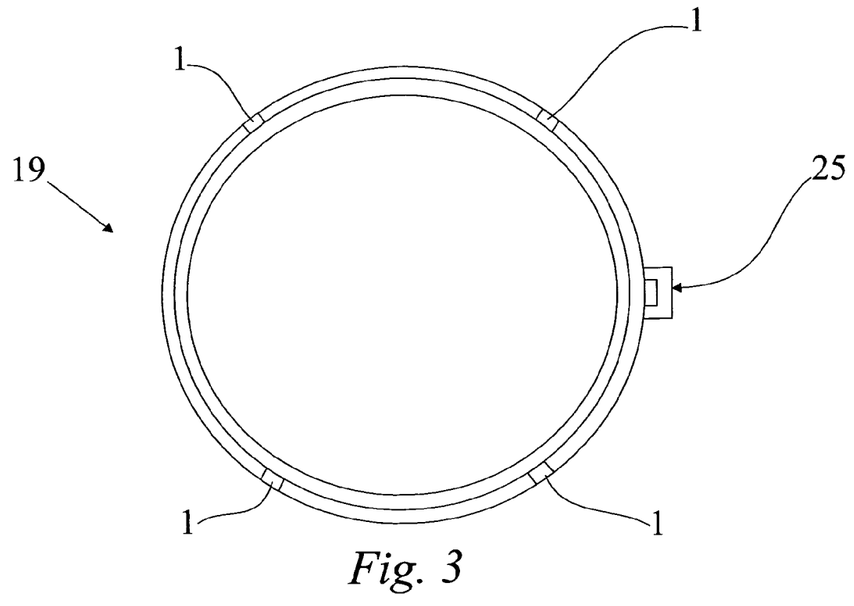

The BOILING CONTAINER 19 is taken at normal position that is, with first opening 21 upwards, and places in it natural milk or previously mixed with filtered water or chocolate or chocolate products, or cappuccino powder, or coffee powder with milk, in the recommended measures, and mixing until dissolved, the same procedures to fill as shown in FIG. 2 being allowed.

Figure 13:
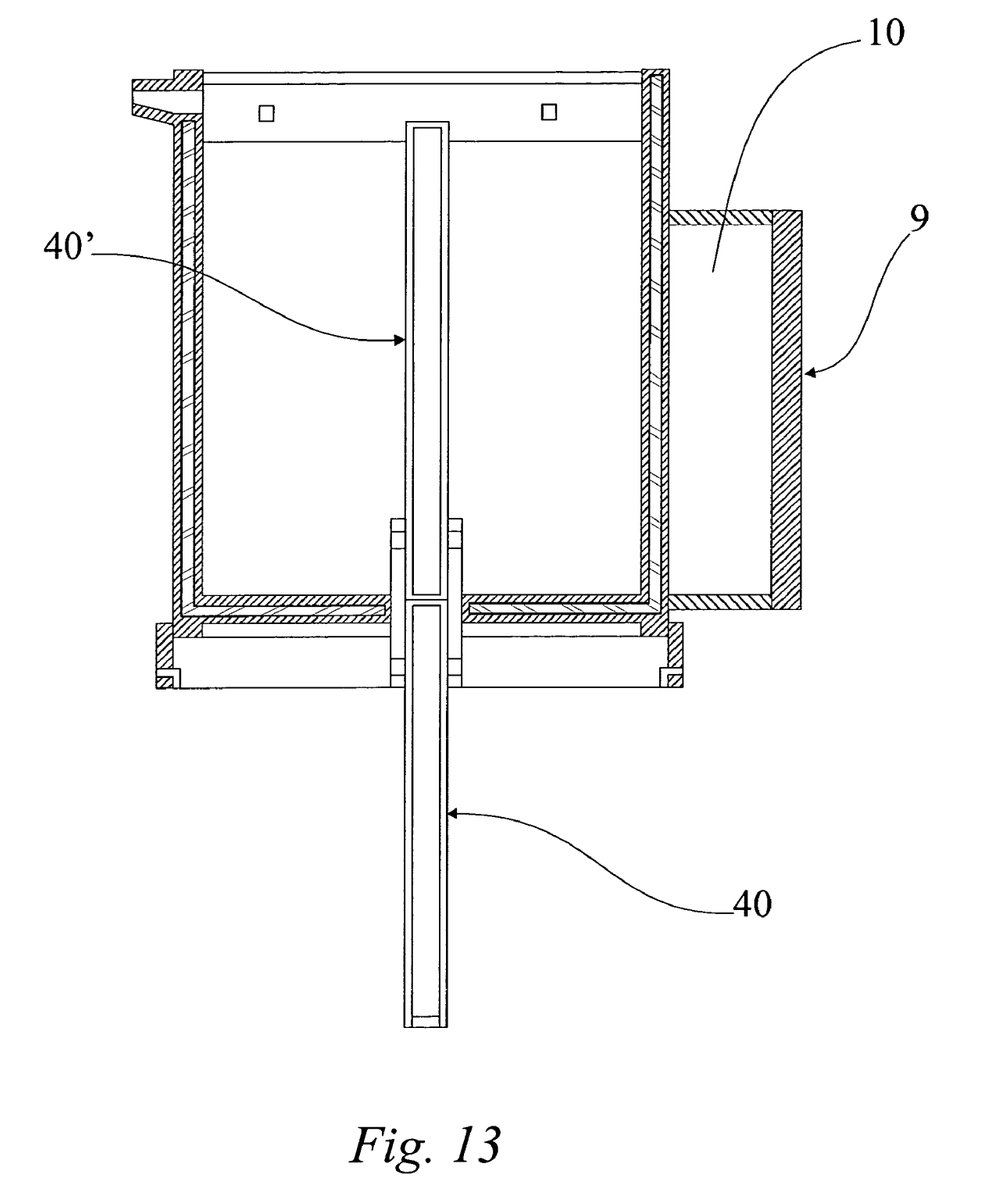
Figure 14:
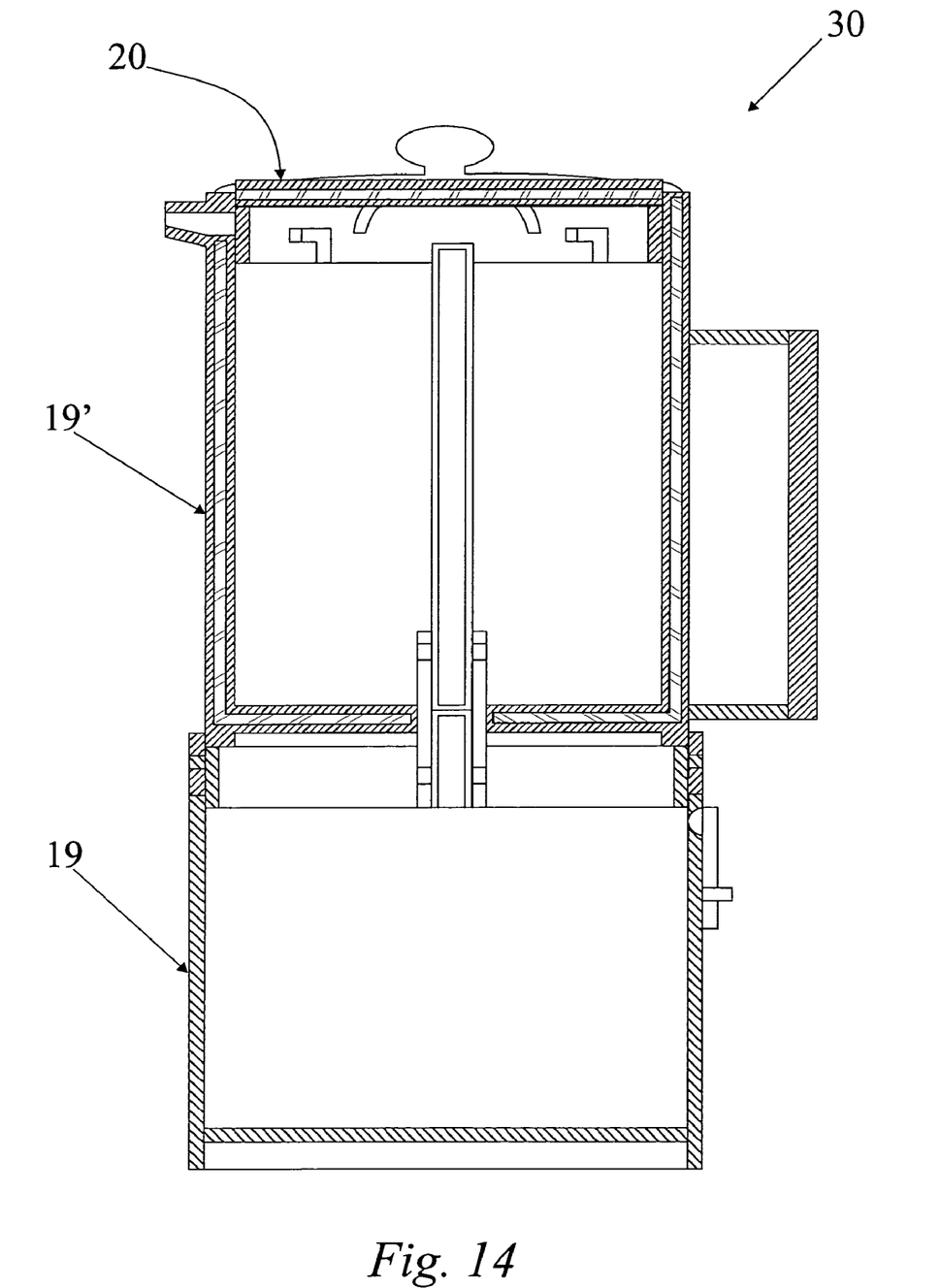

The objective to obtaining the liquid boiled and sterilized to drink. Then, as it is seen in FIG. 13, one places the two liquid conducting tubes 40 and 40' which are fastened to the bottom 26 of the SERVING CONTAINER 19', in its internal and external parts; afterwards, as is shown in FIG. 14, the two containers 19 and 19' are fitted axially positioned and the CAP 20 is placed into the SERVING CONTAINER 19', the MILK JUG 30 begin ready to be taken to the microwave oven for the time stipulated, in this case, approximately two minutes.

Figure 15:
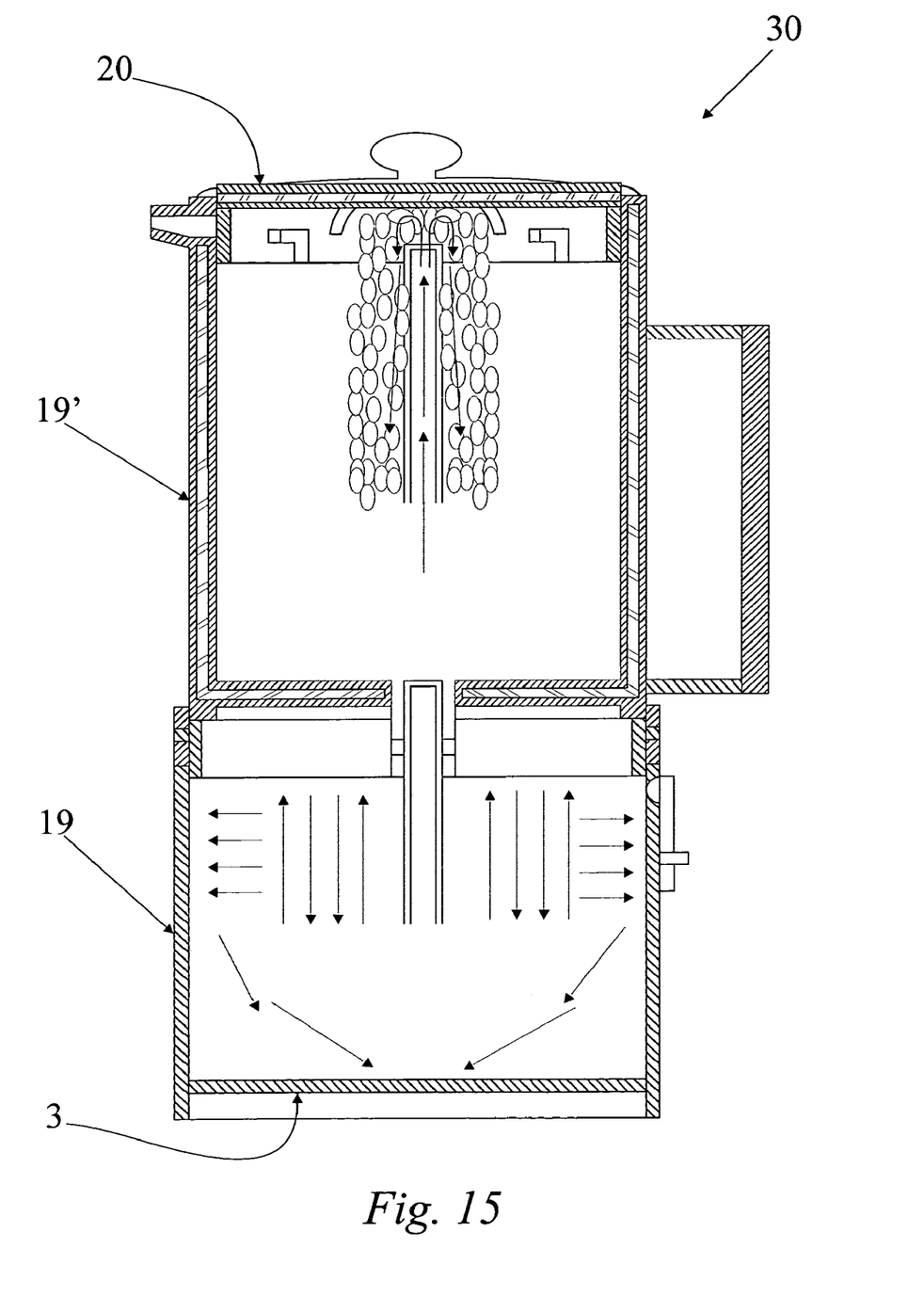
Figure 16:
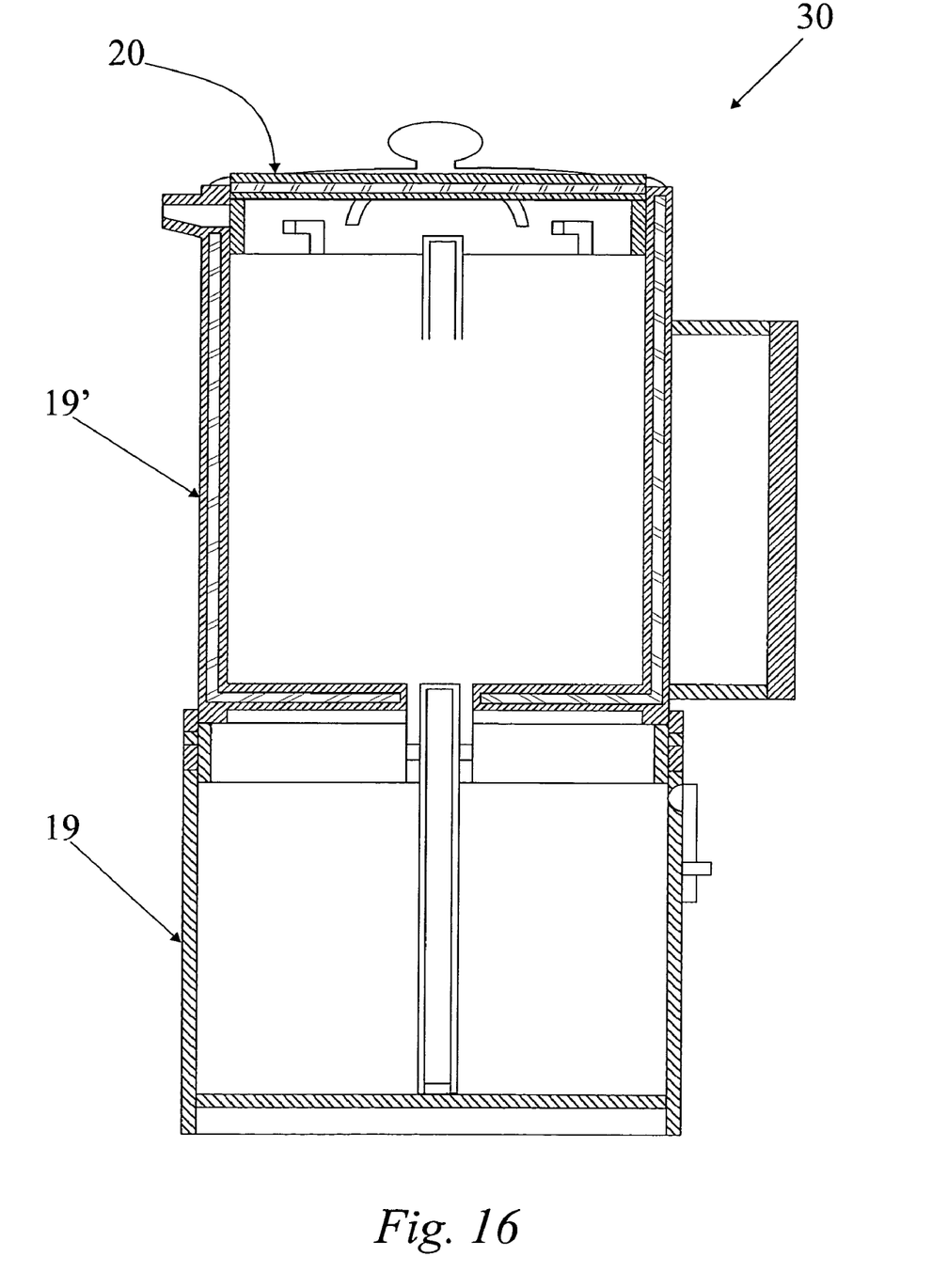

As it can be seen in FIG. 15 through indicative arrows, in the bottom part 3 of the BOILING CONTAINER, the liquid, through the action of microwaves, will start its boiling process that, in being in that, will produce the transformation of the liquid into steam, that in turn will be accumulated in the small empty space without milk, thereby producing pressure for all sides, causing, by force of the pressure exercised, the liquid to leave by the only place possible, that is, the bottom 3 of the container, where the first tube conducting 40 notches 14 are located and in penetrating therein, it will rise by the first tube conducting 40 of this container 19 to the second tube conducting 40' in the SERVING CONTAINER 19' in order to beat its CAP 20 and falling therein under gravity, internally, ready to serve, as it is seen in FIG. 16.

A table indicating heating time in relation to the temperature reached according to type or brand of the microwave oven used, and in accordance with the amount of liquid to be boiled, should be sold with some manual for user's guidance that, thus, will then know in a short period of time, the own table for the temperature x time to be used in his/her microwave oven.

What is claimed:

1. A microwave jug for boiling milk and similar beverages comprising:
   a boiling container having a side wall and a base connected to said side wall, said side wall having a pressure sealing valve positioned therein;
   a serving container having internal walls made of a metallic material covered with a polymer, said serving container being axially positioned over said boiling container, said serving container being adapted to connect to said boiling container, said serving container having a second opening, a bottom positioned opposed to said second opening, said bottom having a central hole and a ring-shaped base axially connected to said bottom, said ring-shaped base surrounding said central hole and said serving container having notches adapted to connect to said boiling container;
   a first conducting tube disposed inside of said boiling container; and
   a second conducting tube being positioned inside of said serving container and being axially associated with said first conducting tube.

2. The microwave jug of claim 1, wherein said side wall of said boiling container defines at least an excavated space with a concave half-spherical format.

3. The microwave jug of claim 2, wherein said pressure sealing valve is fixed to a support positioned in said side wall of said boiling container, said pressure sealing valve being connected to said boiling container, proximate said excavated space, wherein said support is positioned proximate to said first opening of said boiling container.

4. The microwave jug of claim 1, wherein said ring-shaped base has a cylindrical wall, wherein said cylindrical wall rises from said bottom to an internal part of said serving container and further extends below said bottom.

5. The microwave jug of claim 4, wherein said cylindrical wall of said ring-shaped base defines an empty opening therein.

6. The microwave jug of claim 4, wherein said serving container includes a nozzle positioned proximate to said second opening.

7. The microwave jug of claim 5, wherein said first conducting tube has a first end defining a notch and a second end having pins arranged in a cubic array.

8. The microwave jug of claim 1, wherein said second conducting tube includes pins positioned in a first end thereof.

9. The microwave jug of claim 1, wherein pins in said second conducting tube are adapted to connect to said empty opening of said ring-shaped base.

10. The microwave jug of claim 7, wherein said first conducting tube notch is oriented parallel to said base of said boiling container and said pins of said first conducting tube are associated to said empty opening of said cylindrical walls of said ring-shaped base.

11. The microwave jug of claim 1, wherein said metallic material is aluminum.

12. A microwave jug for boiling milk and similar beverages comprising:
   a boiling container having a side wall and a base connected to said side wall, said side wall having a pressure sealing valve positioned therein;
   a serving container having internal walls made of a metallic material covered with a polymer, said serving container being axially positioned over said boiling container, said serving container being adapted to connect to said boiling container;

a first conducting tube disposed inside of said boiling container; and a second conducting tube being positioned inside of said serving container and being axially associated with said first conducting tube, wherein said boiling container has a first opening defined in an upper part thereof, said upper part comprising points in solid cubic format in an external part of said boiling container, proximate said first opening, and said base of said boiling container being disposed axially opposite to said first opening.

13. The microwave jug of claim 12, wherein said serving container is connected to said boiling container through said points in solid cubic format of said boiling container by notches in said serving container.

* * * * *